US005803684A

United States Patent [19]

Wang

[11] Patent Number: 5,803,684

[45] Date of Patent: Sep. 8, 1998

[54] TABLE TOOL HAVING AN ADJUSTABLE SECURING DEVICE

[76] Inventor: Tian Wang Wang, No. 45, Yi Chang East Road, Taiping City, Taichung Hsien, Taiwan

[21] Appl. No.: 879,312

[22] Filed: Jun. 20, 1997

[51] Int. Cl.[6] .......... B23C 1/00

[52] U.S. Cl. .......... 409/229; 144/48

[58] Field of Search .......... 144/1.1, 48, 135.2, 144/136.95, 137, 154.5, 286.1; 409/145, 182, 228, 229

[56] References Cited

U.S. PATENT DOCUMENTS

| | | | |
|---|---|---|---|
| 4,186,784 | 2/1980 | Stone | 144/1.1 |
| 4,350,193 | 9/1982 | McCambridge et al. | 144/286.1 |
| 4,635,692 | 1/1987 | Hulse et al. | 144/1.1 |
| 4,733,704 | 3/1988 | Wolff | 144/286.1 |
| 4,880,042 | 11/1989 | Schafferkotter | 409/182 |
| 5,024,257 | 6/1991 | Lloyd | 409/229 |
| 5,139,061 | 8/1992 | Neilson | 409/182 |
| 5,289,861 | 3/1994 | Hedrick | 144/135.2 |

*Primary Examiner*—Maurina T. Rachuba

[57] ABSTRACT

A table includes two channels and four pressers slidably engaged with the channels by bolts and secured to the table by the bolts. The pressers each includes an extension for engaging with the tool and for pressing the tool in place. Four bolts are threadedly engaged with the free ends of the pressers for spacing the free ends of the pressers from the table and for preventing the free ends of the pressers from being bent when the pressers are secured to the table. The pressers may be adjusted along the channels for securing tools of different sizes.

2 Claims, 3 Drawing Sheets

TABLE TOOL HAVING AN ADJUSTABLE SECURING DEVICE

BACKGROUND OF THE INVENTION

1. Field of the Invention

The present invention relates to a table tool, and more particularly to a table tool having an adjustable securing device for securing facilities of different sizes.

2. Description of the Prior Art

Typical table tools, such as table saws, comprise a circular saw blade rotatably secured to a table. For copying an object, a copying motor is normally required to be secured to the table and beside the saw blade for cutting a workpiece. However, the table is required to be formed with a number of holes for securing the copying motor. When copying motor of different size is required to be secured to the table, a number of further holes are required to be formed for securing the copying motor of different size. The copying motors or other devices of different sizes may not be easily secured to the table.

The present invention has arisen to mitigate and/or obviate the afore-described disadvantages of the conventional table tools.

SUMMARY OF THE INVENTION

The primary objective of the present invention is to provide a table tool which includes an adjustable securing device for securing facilities of different sizes easily.

In accordance with one aspect of the invention, there is provided a table tool comprising a table including two channels, a block for supporting a tool device, four pressers each including a first end having an extension for engaging with the block and each including a second end, and means for slidably securing the pressers along the channels and for allowing the pressers to secure the block of different size.

The slidably securing means includes four bolts engaged through the pressers respectively and each having a head slidably engaged in the channels for allowing the pressers to be slided along the channels, and includes four nuts engaged with the bolts for securing the pressers to the table.

A spacing means includes four bolts threadedly engaged with the second ends of the pressers and for spacing the second ends of the pressers from the table and for preventing the second ends of the pressers from being bent when the slidably securing means is forced against the pressers.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
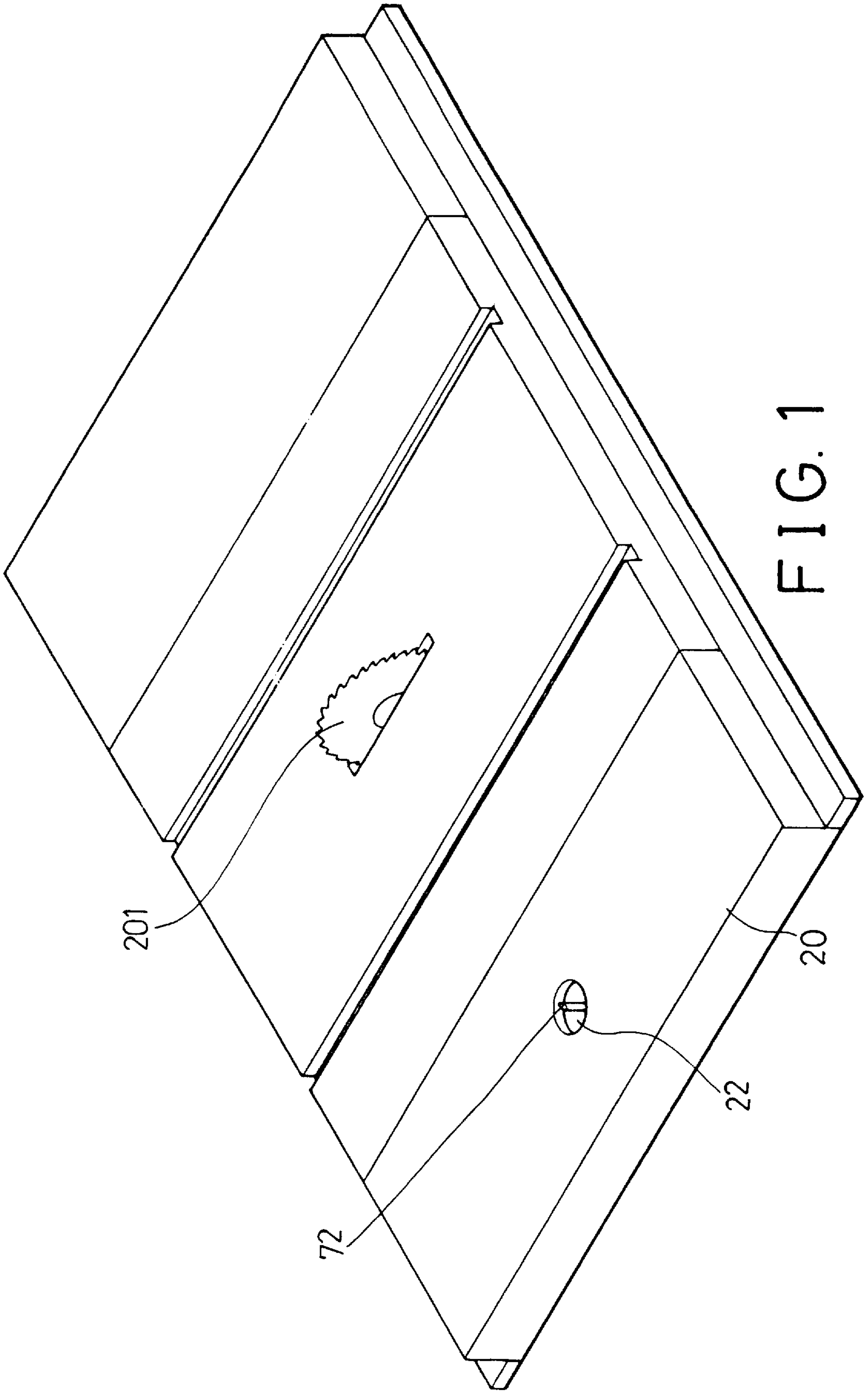
FIG. 1 is a top perspective view of a table tool in accordance with the present invention.
Figure 2:
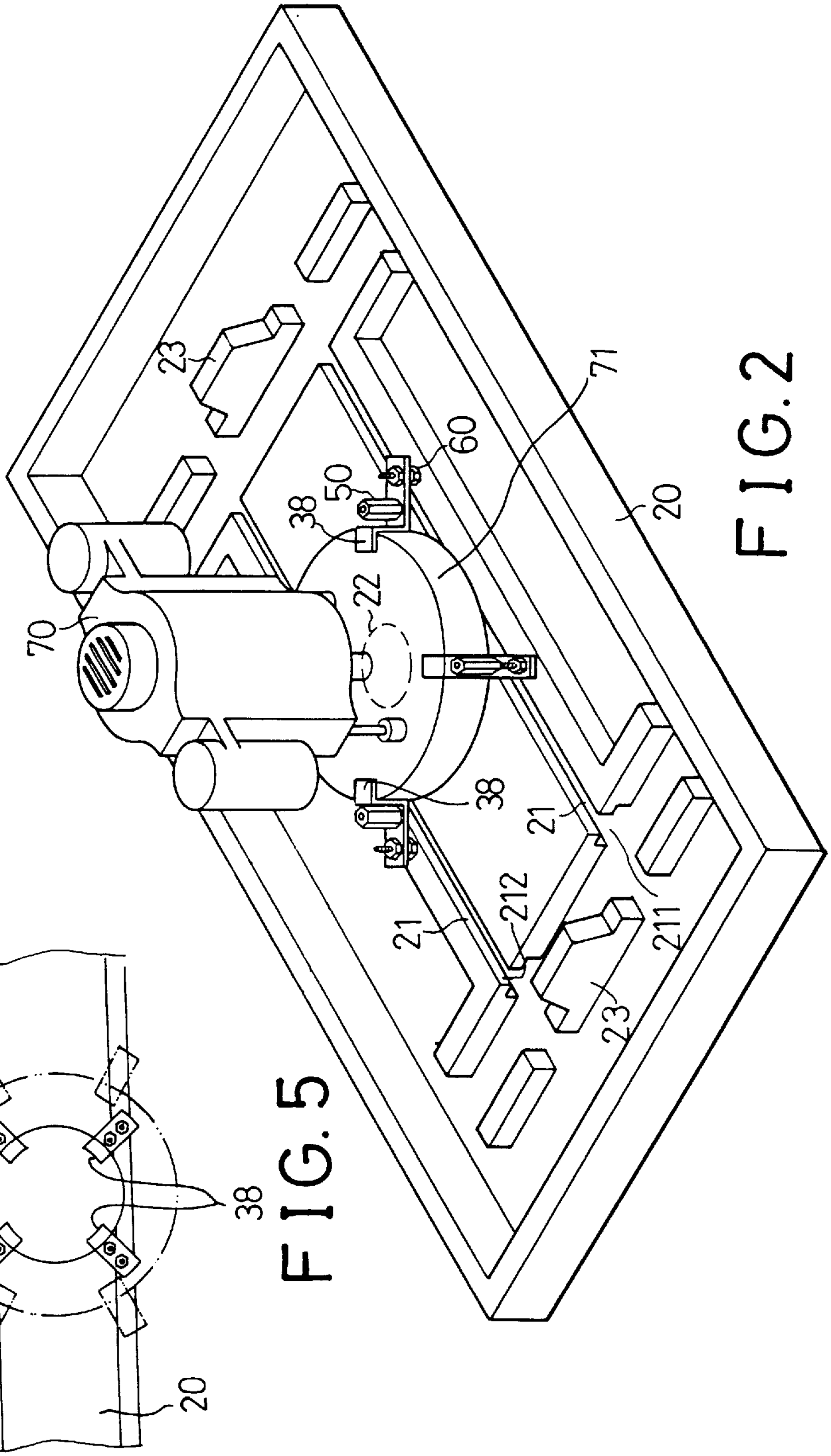
FIG. 2 is a partial bottom perspective view of the table tool, illustrating the adjustable securing device for the table tool.

Referring to the drawings, and initially to FIGS. 1 and 2, a table tool in accordance with the present invention comprises a table 20 for securing machines, such as saw blade 201. The table 20 includes a side portion having an opening 22 for receiving a tool 72, such as a cutting blade for copying purposes. A motor 70 for copying purposes is secured to a block 71 which is required to be secured to the bottom of the table 20. The tool 72 is secured to the motor 70 and driven by the motor 70 for conducting the copying operation. The present invention is to provide an adjustable securing device for securing the copying motors 70 and/or blocks 71 of different sizes to the table 20.

Figure 4:
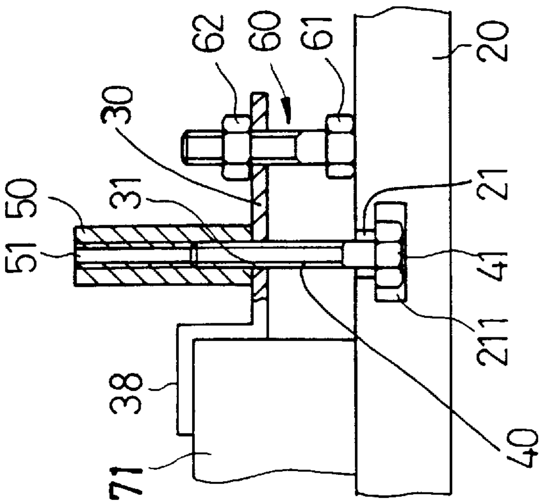
FIG. 4 is a partial cross sectional view of the adjustable securing device.

As shown in FIGS. 2 and 4, the table 20 includes two pairs of flanges 212 for defining two slots 21 and two channels 211 which include a size slightly greater than that of the slots 21 for engaging with the heads 41 of the bolts 40 and for guiding the bolts 40 to slide along the slots 21.

Figure 3:
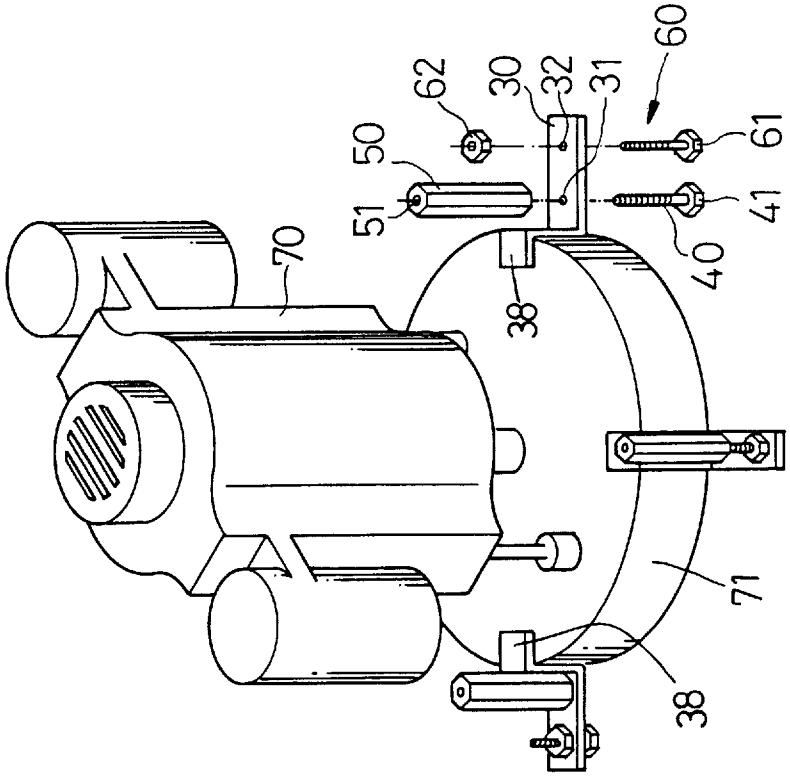
FIG. 3 is a partial exploded view of the object to be secured to the table.

As shown in FIGS. 2–4, four pressers 30 each includes an extension 38 for engaging with the block 71 and each includes an orifice 31 for engaging with the bolt 41 and each includes a screw hole 32 for threadedly engaging with another bolt 60. The bolt 60 includes a head 61 for engaging with the bottom of the table 20 and may be adjusted relative to the presser 30 for adjusting the distance between the presser 30 and the table 20. A nut 62 may be engaged with the bolt 60 for securing the presser 30 in place and for maintaining the presser 30 at the predetermined distance spaced from the table 20. Four stems or nuts 50 each includes an inner thread 51 for threadedly engaging with the bolt 40 and for securing the pressers 30 to the table 20. The nuts 50 each includes a hexagonal outer portion for engaging with wrenches and for allowing the nuts 50 to be rotated relative to the bolts 40.

As shown in FIG. 4, the bolts 60 are provided for supporting the free end portions of the pressers 30 in place and for avoiding the free end portions of the pressers 30 from bending when the nut 50 is secured to the bolt 40 and when the nut 50 applies a force against the presser 30. The block 71 may thus be solidly secured to the table 20 by the pressers 30 and the nuts 50.

Figure 5:
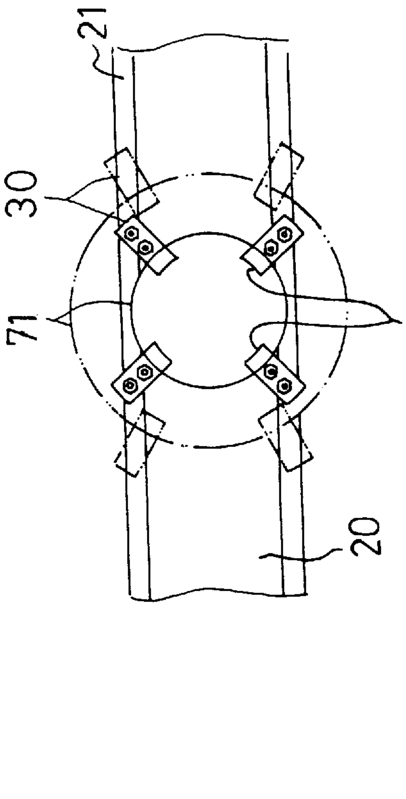
FIG. 5 is a partial bottom view illustrating the operation of the adjustable securing device.

Referring next to FIG. 5, when the blocks 71 of different sizes are required to be secured to the table 20 by the pressers 30, it is only required to slide the bolts 40 and the pressers 30 along the slots 21. The extensions 38 of the pressers 30 may be easily used for pressing the blocks 71 of different sizes.

As shown in FIG. 2, two stops 23 are disposed on the end portions of the slots 21 for engaging with the block 71 and for preventing the block 71 from being easily disengaged from the table 20.

Accordingly, the table tool in accordance with the present invention includes an adjustable securing device for allowing facilities of different sizes to be secured to the table easily.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A table tool comprising:

a table including two channels, a block for supporting a tool device, four pressers each including a first end having an extension for engaging with said block and each including a second end, means for slidably securing said pressers along said channels and for allowing said pressers to secure said block of different size, and means for spacing said second ends of said pressers from said table, said spacing means including four bolts threadedly engaged with said second ends of said Dressers for spacing said second ends of said pressers from said table and for Preventing said second ends of said pressers from being bent when said slidably securing means is forced against said pressers.

2. A table tool according to claim 1, wherein said slidably securing means includes four bolts engaged through said pressers respectively and each having a head slidably engaged in said channels for allowing said pressers to be slided along said channels, and includes four nuts engaged with said bolts for securing said pressers to said table.

* * * * *